United States Patent
Kim et al.

(10) Patent No.: US 11,726,756 B2
(45) Date of Patent: Aug. 15, 2023

(54) SHARED COMPILATION CACHE VERIFICATION SYSTEM

(71) Applicant: Google LLC, Mountain View, CA (US)

(72) Inventors: Hyo Jun Kim, San Jose, CA (US); Rohit Upadhyaya Jayasankar, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 17/554,485

(22) Filed: Dec. 17, 2021

(65) Prior Publication Data
US 2023/0195438 A1   Jun. 22, 2023

(51) Int. Cl.
*G06F 12/084*   (2016.01)
*G06F 8/41*   (2018.01)

(52) U.S. Cl.
CPC .......... *G06F 8/4442* (2013.01); *G06F 12/084* (2013.01); *G06F 2212/1032* (2013.01)

(58) Field of Classification Search
None
See application file for complete search history.

(56) References Cited

U.S. PATENT DOCUMENTS

| | | | |
|---|---|---|---|
| 8,413,125 B2 | 4/2013 | Lee et al. | |
| 11,461,327 B1 * | 10/2022 | Cruanes | G06F 16/24539 |
| 2006/0206884 A1 * | 9/2006 | Creamer | G06F 9/45516 717/147 |
| 2013/0132690 A1 * | 5/2013 | Epstein | G06F 12/145 711/159 |
| 2014/0181797 A1 | 6/2014 | Beretta et al. | |
| 2017/0208150 A1 | 7/2017 | Ekbote et al. | |
| 2018/0349404 A1 * | 12/2018 | Noh | G06F 16/24539 |
| 2019/0042412 A1 * | 2/2019 | Du | G06F 9/544 |

OTHER PUBLICATIONS

International Search Report and Written Opinion for Application No. PCT/US2022/043208, dated Jan. 3, 2023, 13 pages.
Xu et al., "ShareJIT: JIT Code Cache Sharing across Processes and Its Practical Implementation", Proc. ACM Program, Lang., vol. 2, No. OOPSLA, Article 124, Nov. 2018, pp. 124:1-124:23.

* cited by examiner

*Primary Examiner* — Marina Lee
(74) *Attorney, Agent, or Firm* — Dority & Manning, P.A.

(57) ABSTRACT

Example embodiments of the present disclosure provide, in one example aspect, an example computer-implemented method for verification of a shared cache. The example method can include retrieving a precompiled shared cache entry corresponding to a shared cache key, the shared cache key being associated with an operation request. The example method can include obtaining a directly compiled resource associated with the operation request. The example method can include certifying one or more portions of the shared cache based at least in part on a comparison of the precompiled shared cache entry and the directly compiled resource.

20 Claims, 11 Drawing Sheets

SHARED COMPILATION CACHE VERIFICATION SYSTEM

FIELD

The present disclosure relates generally to data caching. More particularly, the present disclosure relates to verifying entries of a shared cache.

BACKGROUND

Compute nodes may be operated under a just-in-time compilation scheme, in which code for performing requested operations can be compiled on demand. However, to avoid duplicative compilation, a cache of precompiled binaries can be made available to the compute node so that, when an operation is requested for a second or subsequent time, the code can be retrieved from cache and executed on the compute node.

SUMMARY

Aspects and advantages of embodiments of the present disclosure will be set forth in part in the following description, or can be learned from the description, or can be learned through practice of the embodiments.

In one aspect, the present disclosure provides an example computer-implemented method for certifying a shared cache. The example method includes retrieving, by a computing system including one or more processors, a precompiled shared cache entry corresponding to a shared cache key, the shared cache key being associated with an operation request. The example method includes obtaining, by the computing system, a directly compiled resource associated with the operation request. The example method includes certifying, by the computing system, one or more portions of the shared cache based at least in part on a comparison of the precompiled shared cache entry and the directly compiled resource.

In another aspect, the present disclosure provides an example non-transitory, computer-readable medium storing instructions that, when executed, cause one or more processors to perform example operations. The example operations include retrieving a precompiled shared cache entry corresponding to a shared cache key, the shared cache key being associated with an operation request. The example operations include obtaining a directly compiled resource associated with the operation request. The example operations include certifying one or more portions of the shared cache based at least in part on a comparison of the precompiled shared cache entry and the directly compiled resource.

In another aspect, the present disclosure provides an example shared cache verification system. The example system includes one or more processors. The example system includes one or more non-transitory, computer-readable media that comprise instructions that, when executed, cause the one or more processors to perform example operations. The example operations include receiving, from a compute node processing a requested operation, a request for a precompiled shared cache entry from a shared cache. The example operations include obtaining a certification status for the shared cache based at least in part on a comparison of (i) a directly compiled resource compiled by the compute node for performing the requested operation and (ii) the precompiled shared cache entry, wherein the certification status indicates an incompatibility of the precompiled shared cache entry with the compute node. The example operations include deactivating the shared cache for one or more future requests from the compute node.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures.

Figure 1A:
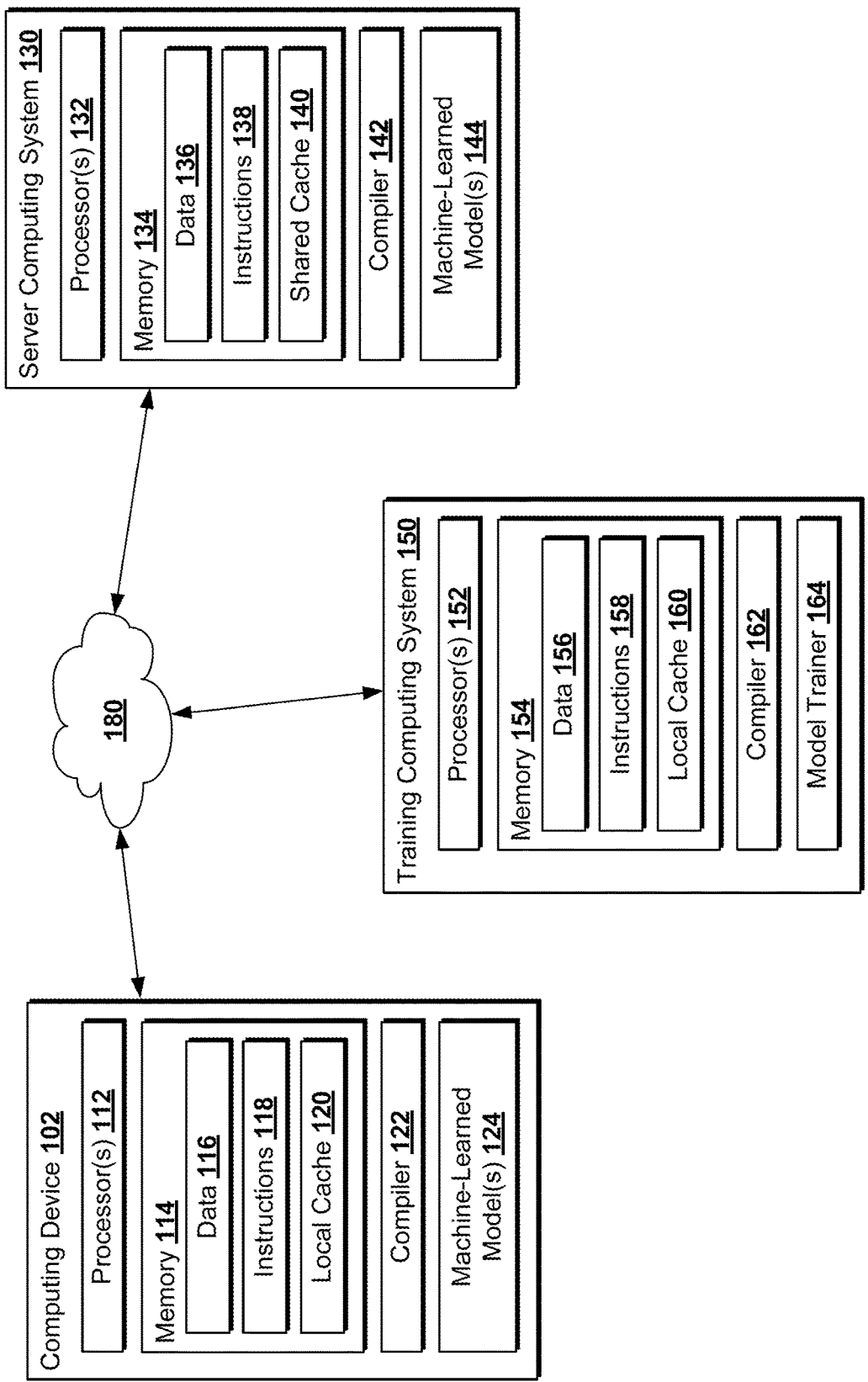
FIG. 1A depicts a block diagram of an example computing system that performs shared compilation cache verification according to example embodiments of the present disclosure.

Reference numerals that are repeated across plural figures are intended to identify the same features in various implementations.

DETAILED DESCRIPTION

Overview

Generally, the present disclosure is directed to systems and methods for shared cache verification. For instance, example embodiments according to aspects of the present disclosure relate to techniques that can be used for managing a shared cache of compiled resources. For example, in some embodiments, when a plurality of compute nodes are configured to be available for use to perform the same or similar operations, a shared cache can be made available to the nodes so that resources already compiled by one node can be reused by another node for performing the same or similar operations. However, in some scenarios, deploying a shared cache can be associated with a risk of incompatibility. For example, a shared cache entry compiled on one node might not be fully compatible with or otherwise valid for execution on another node (e.g., due to hardware differences, firmware differences, software differences, configuration differences, etc.). Resource incompatibilities can be associated with risk of system failure, data loss, downtime, vulnerabilities, etc.

Advantageously, systems and methods according to example aspects of the present disclosure can provide for improved verification of a shared cache. For example, in some embodiments, a shared cache can be certified according to aspects of the present disclosure before it is trusted to serve cached resources among multiple endpoints. For instance, in some embodiments, a shared cache can be assigned a certification status (e.g., with states including valid/certified, invalid, uncertified, etc.). The certification status can be maintained, updated, and/or reset based on a state-based approach.

The certification status can be determined, in some embodiments, by validating one or more precompiled shared cache entries in the shared cache against one or more resources directly compiled for the desired endpoint (e.g., locally compiled, compiled by a just-in-time compiler, etc.). For instance, a directly compiled counterpart compiled for or by a node may be referenced as an example of a resource compatible with that node. In this manner, for example, the precompiled shared cache entries can be validated as compatible by comparison to known compatible resources.

For instance, in some embodiments, a compute node can receive a request to perform an operation. The compute node can query a shared cache to obtain a precompiled resource associated with the requested operation(s). In some cases, the compute node can also obtain a directly compiled resource (e.g., locally compiled by the node, compiled for the node by a just-in-time compiler, etc.) for the requested operation(s) and compare the result(s) with the precompiled resource retrieved from the shared cache. In some embodiments, based on the comparison (e.g., a positive comparison, such as a match), the precompiled resource can be validated (e.g., indicated as compatible). In this manner, for example, precompiled resources in the shared cache can be determined to be compatible and thus leveraged to obtain improved performance across one or more compute nodes. In some embodiments, however, based on obtaining a negative comparison (e.g., an incompatibility is detected, etc.), the shared cache can be deactivated in whole or in part to avoid or reduce the risks of executing incompatible resources on one or more connected compute node(s).

In some embodiments according to example aspects of the present disclosure, precompiled cache entries can be stored in the shared cache in association with a shared cache key. A shared cache key can be configured as a handle to retrieve a corresponding precompiled cache entry. For instance, in some examples, a precompiled shared cache resource can be initialized and assigned a shared cache key that encodes one or more identifiers for the resource. In some embodiments, the identifiers can link a request (e.g., a request for processing by a compute node) to a resource for performing the requested operations on the compute node.

For instance, in some embodiments, a shared cache key can be configured to distinguish a target shared cache entry for performing the requested operations on the compute node from other entries (e.g., other resources not compatible with the compute node). In some embodiments, a shared cache key can include an abbreviated representation of or pointer to a shared cache entry. In some embodiments, for instance, an abbreviated representation of a shared cache entry can include a hash or other encoding of one or more aspects or portions of the shared cache entry (e.g., a hash or other encoding of tag, label, title, structure, contents, locator, etc. of the entry). In some embodiments, an abbreviated representation of a shared cache entry can include a hash or other encoding of one or more aspects or portions of a request for operations performed by the shared cached entry. For instance, in some embodiments, a shared cache key can be generated from a request for operations on a compute node, and the key can be matched with a previously-stored key associated with a precompiled shared cache entry that was previously compiled on the same or a similar (e.g., cross-compatible) compute node. In this manner, for instance, given a request for operations (e.g., a function call, etc.), a shared cache key can be obtained operable to retrieve from the shared cache a resource configured to perform the requested operations. And in this manner, for example, a shared cache key can be configured to retrieve compatible entries in a shared cache.

To help ensure that a shared cache key appropriately retrieves compatible shared cache entries (e.g., configured to adequately distinguish cross-node incompatibilities), systems and methods according to example aspects of the present disclosure can provide for a shared cache certification. A shared cache can be associated with, for instance, a certification status indicator or other certificate determined based on validation of one or more entries in the shared cache.

For instance, a shared cache entry retrieved to perform operations associated with a request can be compared to a directly compiled resource associated with the request. In some embodiments, a directly compiled resource can include a resource locally compiled by a node requesting a cached resource. In some embodiments, a directly compiled resource can be compiled by a just-in-time compiler (e.g., on the node, on a server servicing the node, etc.). In some examples, for instance, a directly compiled resource can be compiled by a compiler configured for compiling resources compatible with a target node.

In some embodiments, the directly compiled resource can include, for example, executable code compiled for performing operations associated with the request. The shared cache entry can include, for example, pre-compiled executable code also configured for performing operations associated with the request.

The comparison of the directly compiled resource and the shared cache entry can include, for example, a comparison of fingerprints (e.g., hashes or other encodings providing identification) of each of the directly compiled resource and the shared cache entry. For instance, in some embodiments, if one or more portions of each of the directly compiled resource and the shared cache entry correspond to equivalent (e.g., identical) hash values, then it may be determined that the shared cache entry is sufficiently interchangeable with the directly compiled resource such that the shared cache entry may be trusted for compatible execution on the compute node. In this manner, for instance, one or more shared cache entries (e.g., and/or the keys associated therewith) can be validated by a successful comparison (e.g., a comparison satisfying one or more compatibility criteria, etc.) with one or more corresponding directly compiled resources.

In some embodiments, fingerprints used in validating one or more shared cache entries can be configured to reveal differences between one or more shared cache entries and their directly compiled counterparts. For example, in some embodiments, a fingerprint can be configured to granularly reflect the contents of a resource (e.g., a shared cache entry, a directly compiled resource, etc.). For instance, a fingerprint can include a hash value or other encoding generated from the resource (e.g., for the entire contents of the resource, for operative contents of the resource, etc.). In this manner, for example, the fingerprint can advantageously reveal potential incompatibilities between a directly compiled resource and a shared cache entry, even if the shared cache entry is retrieved by a shared cache key associated with both the directly compiled resource and the shared cache entry.

In some embodiments, for example, a fingerprint can be used as a verification of the reliability of a shared cache key configuration. For instance, in a simplistic example, consider a request for a compute node to perform Operation A. A key could be some encoding of "Operation A," and the compute node could query a shared cache with the key to retrieve a precompiled shared cache entry tagged with a key indicating "Operation A." To test if the precompiled shared cache entry is compatible with the compute node, the compute node could obtain a directly compiled resource for performing the requested Operation A. The directly compiled resources can be compared with the retrieved precompiled shared cache entry to validate. However, a comparison (e.g., of hash values, other encodings, etc.) could reveal that the retrieved resource differs from the directly compiled resource so as to be an invalid resource for the requesting node. For instance, the retrieved precompiled resource could have been compiled to perform an Operation A by a node of Type 1, whereas the requesting node is of a Type 2 incompatible with resources compiled by nodes of Type 1. Because the shared cache key configuration scheme failed to distinguish between resources compiled for Type 1 nodes and those compiled for Type 2 nodes, one or more portions of the shared cache can be decertified or otherwise invalidated, so as to prevent invalid cached resources from being served.

Example embodiments according to example aspects of the present disclosure provide a number of technical effects and benefits. By providing improved verification of shared cache implementations, example embodiments can provide for improved performance of computing systems by leveraging precompiled code across one or more individual nodes, such that individual nodes are not unnecessarily tasked with duplicative compiling. For instance, example embodiments can provide for increased speed, decreased latency, decreased network bandwidth requirements, decreased power consumption, decreased memory usage, etc. for one or more compute nodes (e.g., individually and/or collectively) by providing a safe and reliable means for deploying a shared cache system. For instance, when a new computing node is brought online, traditionally it may lack a prepopulated local cache, such that operations performed on the new node might not generally benefit from the processing improvements of cached resources, having to compile all operations on demand—however, according to example embodiments of the present disclosure, a certified shared cache can be used to more efficiently populate the local cache of the new node, advantageously decreasing processing requirements (e.g., and associated lead times) for bringing a new node online. In another example, for instance, an existing node may encounter new tasks, and instead of needing to directly compile resources to complete the tasks, example embodiments of a shared cache system according to the present disclosure can provide for supplying the node with precompiled resources for processing the new tasks with improved speed and efficiency.

Another additional advantage includes, in some example embodiments, improved robustness against execution faults and/or other consequences of incompatible or unapproved code. For instance, in some examples, improved verification techniques according to aspects of the present disclosure can increase system reliability and/or security of one or more compute nodes, providing for increased uptime, fewer unauthorized execution events, less maintenance cost (e.g., computational cost for debugging, time and expense of labor cost, etc.). In this manner, for example, less computing resources may be expended to provide a target level of uptime, reliability, and/or security. Alternatively, or additionally, in some embodiments, improved uptime, reliability, and/or security can be achieved by more efficiently using computing resources (e.g., decreased network bandwidth requirements, decreased power consumption, decreased memory usage, etc.). In this manner, for example, the functioning of an example embodiment of a computing system itself can be improved by decreasing risks of fault while providing for improved processing, latency, etc.

With reference now to the Figures, example embodiments of the present disclosure will be discussed in further detail.

Example Devices and Systems

FIG. 1A depicts a block diagram of an example computing system 100 that performs shared cache verification according to example embodiments of the present disclosure. The system 100 includes a computing device 102, a server computing system 130, and a training computing system 150 that are communicatively coupled over a network 180.

The computing device 102 can be any type of computing device, such as, for example, a personal computing device (e.g., laptop or desktop), a mobile computing device (e.g., smartphone or tablet), a gaming console or controller, a wearable computing device, an embedded computing device, a workstation, a computing endpoint of a distributed system, a server computing device, a host device of one or more virtual machines, or any other type of computing device.

The computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the computing device 102 to perform operations.

The memory 114 can also include a local cache 120 for storing compiled instructions (e.g., compiled instructions 118) for execution on the computing device 102. For instance, a local compiler 122 can compile instructions 118 (e.g., for executing one or more operations of machine-learned model(s) 124). To provide for decreased processing requirements and lowered latency on one or more future executions of the instructions 118, one or more compiled instructions can be stored in the local cache 120.

In some implementations, the computing device 102 can store or include one or more machine-learned models 124. For example, the machine-learned models 124 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 124 can be received from the server computing system 130 over network 180, stored in the computing device memory 114, and then used or otherwise implemented by the one or more processors 112. In some implementations, the computing device 102 can implement multiple parallel instances of a single machine-learned model 124.

Additionally, or alternatively, one or more machine-learned models 144 can be included in or otherwise stored and implemented by the server computing system 130 that communicates with the computing device 102 according to a client-server relationship. For example, the machine-learned models 144 can be implemented by the server computing system 140 as a portion of a web service. Thus, one or more models 124 can be stored and implemented at the computing device 102 and/or one or more models 144 can be stored and implemented at the server computing system 130.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

The memory 134 can also include a shared cache 140 for storing compiled instructions (e.g., compiled instructions 118, compiled instructions 138) for execution on the computing device 102, the server computing system 130, and/or the training computing system 150. For instance, a server compiler 142 can compile instructions 118 and/or instructions 138 (e.g., for executing one or more operations of machine-learned model(s) 124 and/or of machine-learned model(s) 144). To provide for decreased processing requirements and lowered latency on one or more future executions of the instructions 118 and/or instructions 138, one or more compiled instructions can be stored in the shared cache 140.

In some embodiments, as discussed herein, the shared cache 140 can be configured to serve one or more entries (e.g., resources, such as precompiled resources) to one or more other systems and devices over the network 180. In some embodiments, a plurality of computing devices 102 are each in communication with the server computing system 130 and are configured to receive precompiled resources from the shared cache 140. For instance, the system 100 can, in some embodiments, coordinate compile tasks among the computing device 102, training computing system 150, and the server computing system 130 to leverage the shared cache 140 (and, in some embodiments, more powerful processors 132 and/or compiler 142).

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 144. For example, the models 144 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 102 and/or the server computing system 130 can train the models 124 and/or 144 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The memory 154 can also include a local cache 160 for storing compiled instructions (e.g., compiled instructions 158) for execution on the training computing system 150. For instance, a local compiler 162 can compile instructions 158 (e.g., for executing one or more operations of model trainer 164). To provide for decreased processing requirements and lowered latency on one or more future executions of the instructions 158, one or more compiled instructions can be stored in the local cache 160.

The training computing system 150 can include a model trainer 164 that trains the machine-learned models 124 and/or 144 stored at the computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 164 can perform a number of generalization techniques (e.g., weight decays, dropouts, etc.) to improve the generalization capability of the models being trained. In particular, the model trainer 164 can train the machine-learned models 124 and/or 144 based on a set of training data.

In some implementations, if consent is provided, the training examples can be provided by the computing device 102. Thus, in such implementations, the model 124 provided to the computing device 102 can be trained by the training computing system 150 on device-specific data received from the computing device 102. In some instances, this process can be referred to as personalizing the model.

The model trainer 164 includes computer logic utilized to provide desired functionality. The model trainer 164 can be implemented in hardware, firmware, and/or software controlling a general-purpose processor. For example, in some implementations, the model trainer 164 includes program files stored on a storage device, loaded into a memory, and executed by one or more processors. In other implementations, the model trainer 164 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system 100 that can be used to implement the present disclosure. Other computing systems can be used as well. For example, in some implementations, the computing device 102 can include the model trainer 164 and a training dataset. In such implementations, the models 124 can be both trained and used locally at the computing device 102. In some of such implementations, the computing device 102 can implement the model trainer 164 to personalize the models 124 based on device-specific data.

Figure 1B:
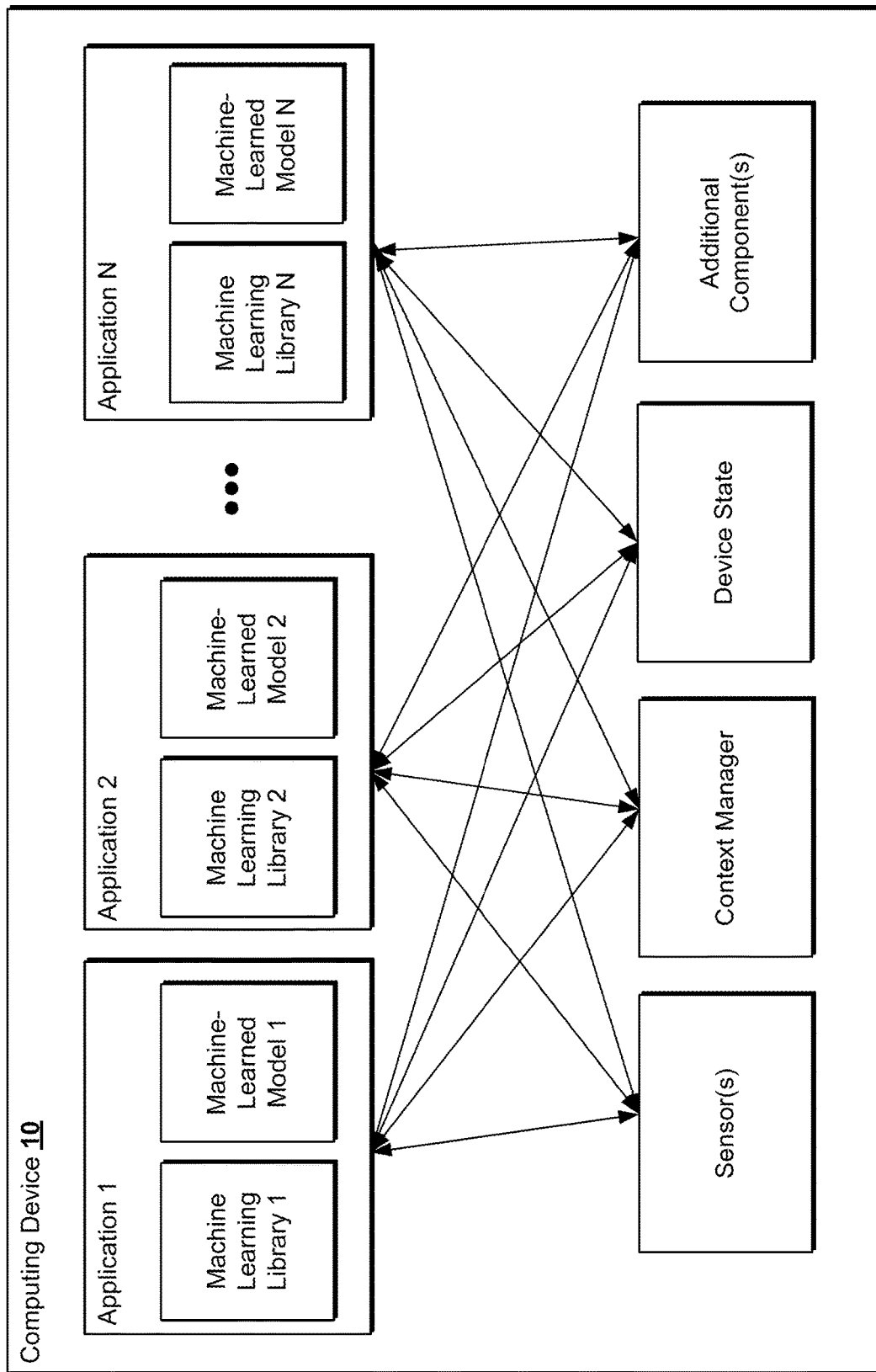
FIG. 1B depicts a block diagram of an example computing device that performs shared compilation cache verification according to example embodiments of the present disclosure.

FIG. 1B depicts a block diagram of an example computing device 10 that performs according to example embodiments of the present disclosure. The computing device 10 can be, in various embodiments, a client computing device or a server computing device. For example, the computing device 10 can correspond to a computing device 102. In some embodiments, the computing device 10 (e.g., a computing device 102) can provide machine-learning model operations via network 180 to one or more client computing devices.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
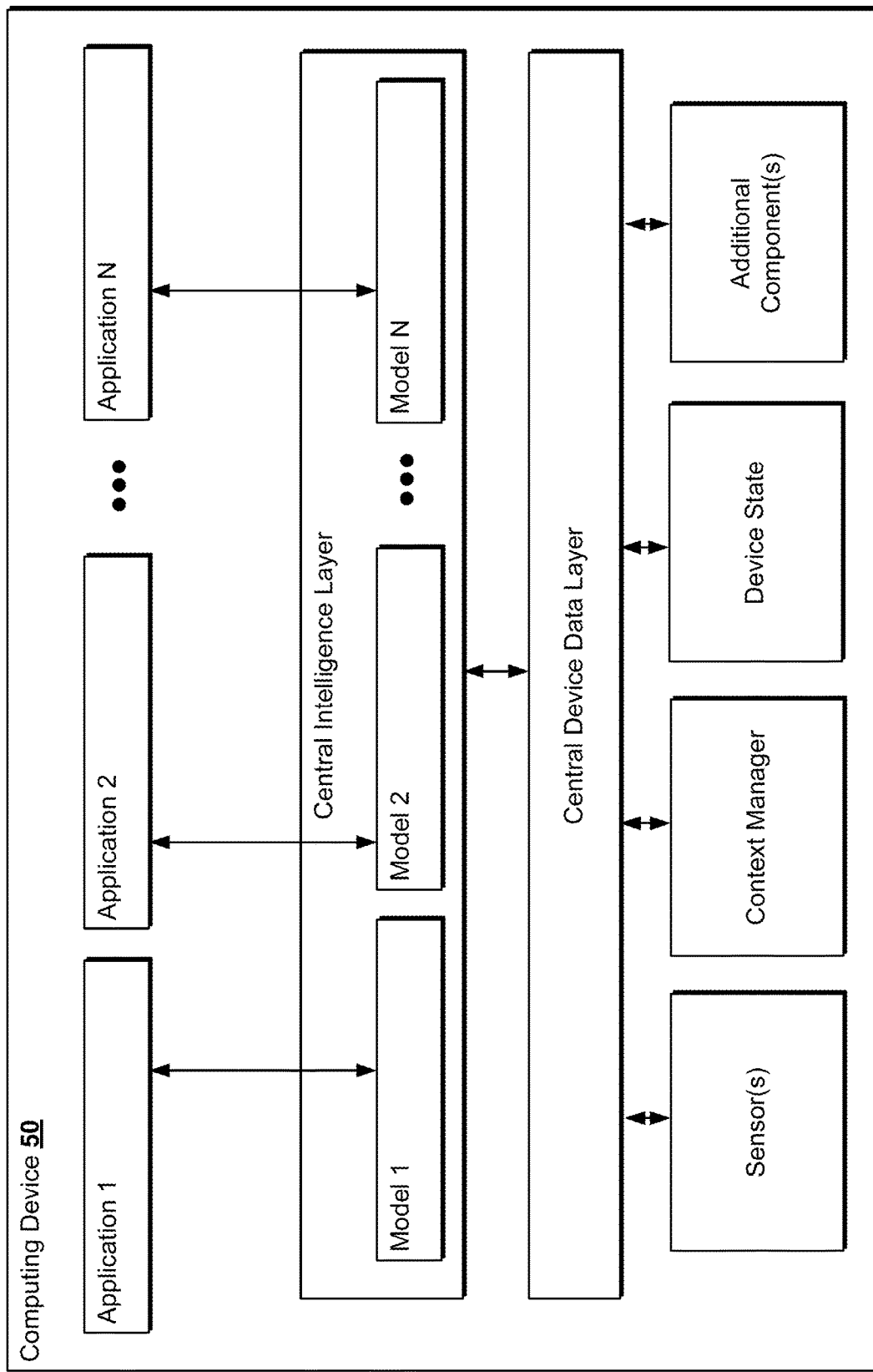
FIG. 1C depicts a block diagram of an example computing device that performs shared compilation cache verification according to example embodiments of the present disclosure.

FIG. 1C depicts a block diagram of an example computing device 50 that performs according to example embodiments of the present disclosure. The computing device 50 can be a client computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
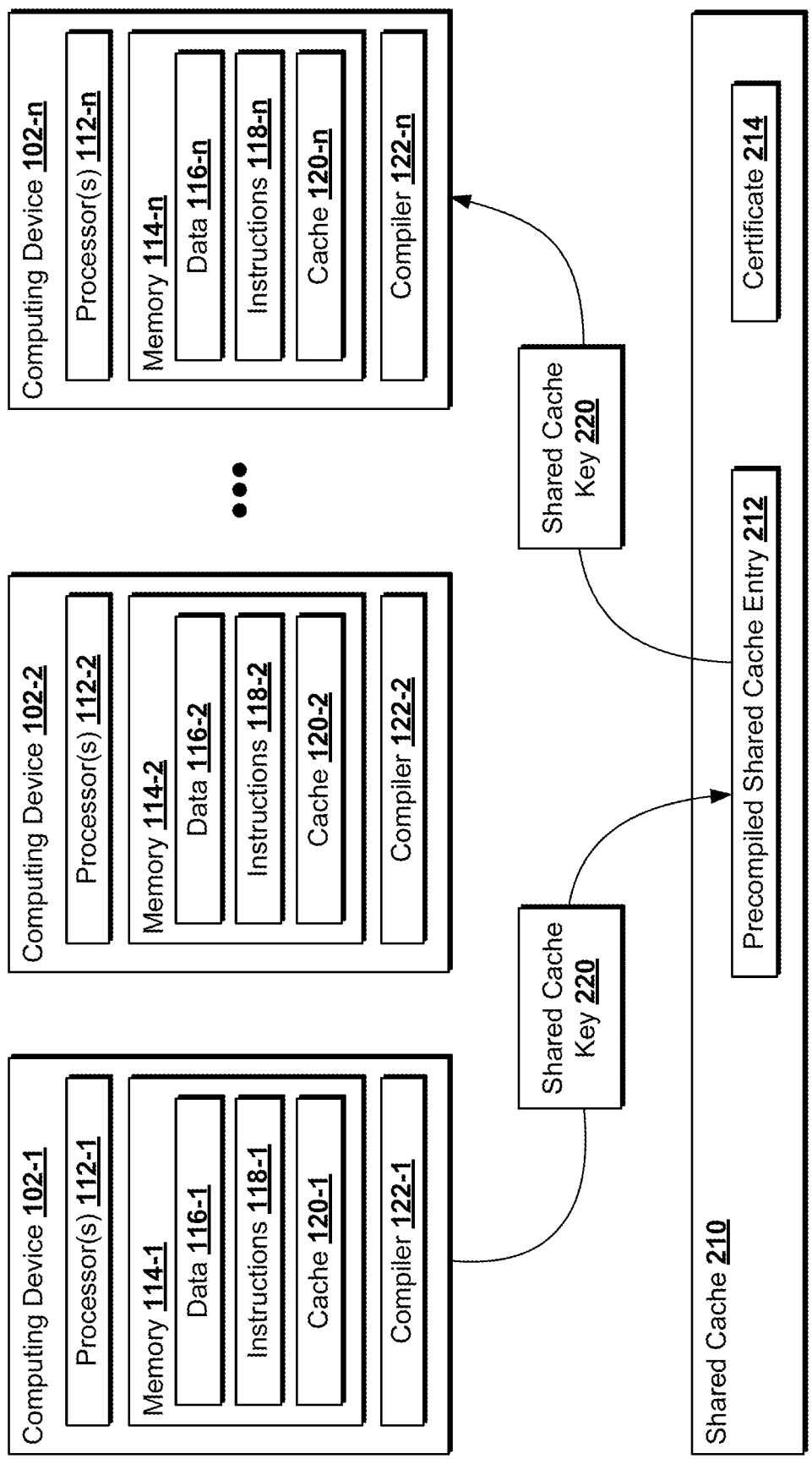
FIG. 2 depicts a block diagram of additional aspects of an example shared compilation cache verification system according to example embodiments of the present disclosure.

FIG. 2 illustrates a number of computing devices 102-1, 102-2, . . . , 102-$n$ serviced by a shared cache 210. As shown, the computing devices 102-1, 102-2, . . . , 102-$n$ respectively include one or more processors 112-1, 112-2, . . . , 112-$n$, and memory 114-1, 114-2, . . . , 114-$n$. The one or more processors can be any suitable processing device (e.g., a processor core, a microprocessor, an ASIC, an FPGA, a controller, a microcontroller, etc.) and can be one processor or a plurality of processors that are operatively connected. The memory can include one or more non-transitory computer-readable storage media, such as RAM, ROM, EEPROM, EPROM, flash memory devices, magnetic disks, etc., and combinations thereof. The memory 114-1, 114-2, . . . , 114-$n$ can respectively store data 116-1, 116-2, . . . , 116-$n$ and instructions 118-1, 118-2, . . . , 118-$n$ which are executed by the processors to cause the respective computing devices to perform operations.

The memory 114-1, 114-2, . . . , 114-n can also respectively include local caches 120-1, 120-2, . . . , 120-n for storing compiled instructions for execution on the respective computing devices, respectively compiled by local compilers 122-1, 122-2, . . . , 122-n. To provide for decreased processing requirements and lowered latency on one or more future executions of the instructions, one or more compiled instructions can be stored in the local cache for the respective computing device.

However, in some embodiments, one or more of computing devices 102-1, 102-2, . . . , 102-n may be requested to perform a task for which the respective local cache does not contain a precompiled resource. For example, computing device 102-n may be initialized and added to the array of computing devices, and it may not yet contain any precompiled resources in its local cache 120-n. In one example, the local cache 120-1 of computing device 102-1 can store a precompiled resource in the shared cache 210 as precompiled shared cache entry 212 associated with shared cache key 220. For instance, the computing device 102-1 can contribute the precompiled shared cache entry 212 (e.g., a resource compiled by compiler 122-1) to be stored and associated with a shared cache key 220 (e.g., a key configured to enable retrieval of the precompiled shared cache entry 212). Accordingly, the computing device 102-n can, in some embodiments, receive a request to perform operations associated with the shared cache key 220. Thus, the computing device 102-n can query the shared cache 210 with the shared cache key 220 to retrieve the precompiled shared cache entry 212 for performing the requested operations. If the shared cache 210 has a valid certificate 214 (e.g., a certificate indicating that the shared cache 210 is compatible with the computing device 102-n), then the precompiled shared cache entry 212 can be used by the computing device 102-n to perform the requested operations. Similarly, in some embodiments, one or more entries of the shared cache 210 can be populated into cache 120-n of computing device 102-n (e.g., automatically, before receiving an associated request, etc.) if the shared cache 210 has a positive certificate 214.

Figure 3:
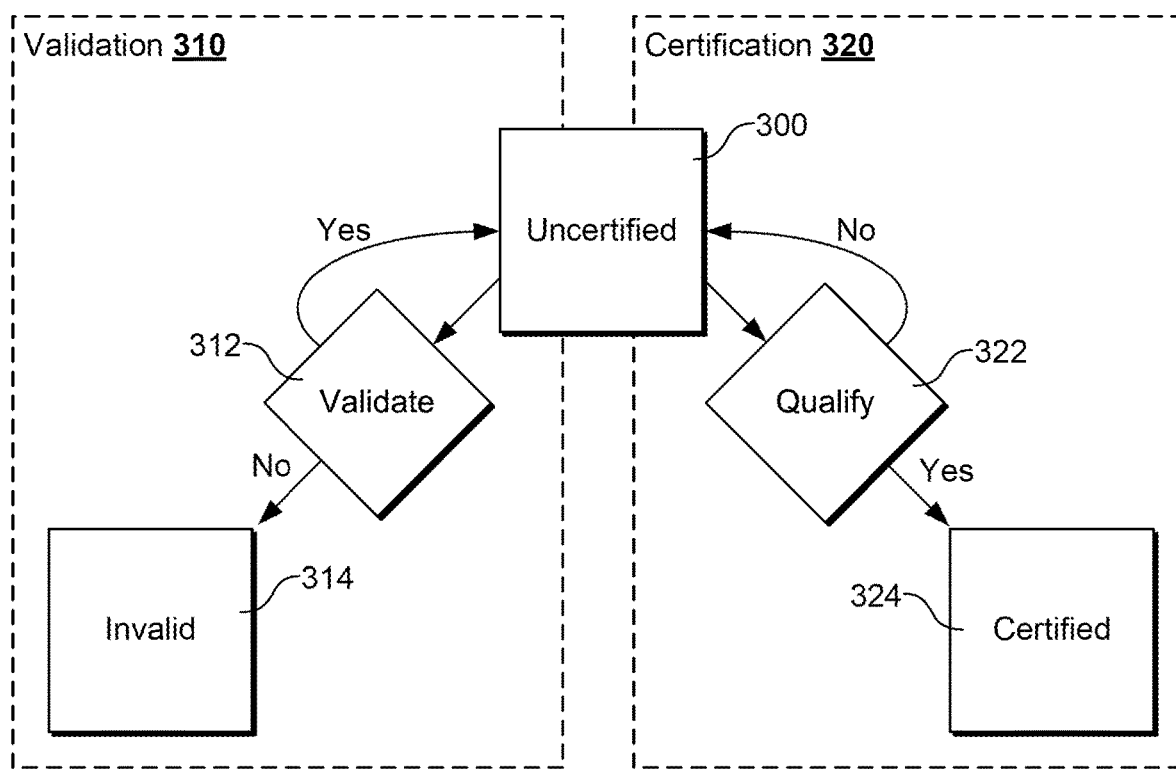
FIG. 3 depicts a block diagram of an example data flow for aspects of an example shared compilation cache verification system according to example embodiments of the present disclosure.

FIG. 3 illustrates an example state-based approach to determining a certification status (e.g., for updating certificate 214). An initialized state 300 of the shared cache can be labeled "uncertified." The state can be updated in a validation update cycle 310 and/or in a certification update cycle 320. The validation update cycle 310 includes determining a validation status of one or more entries of a shared cache (e.g., a precompiled shared cache entry 212 of a shared cache 210) and/or shared cache keys associated therewith at a validation check 312. A failure to validate triggers an invalid status state update 314.

Figure 4:
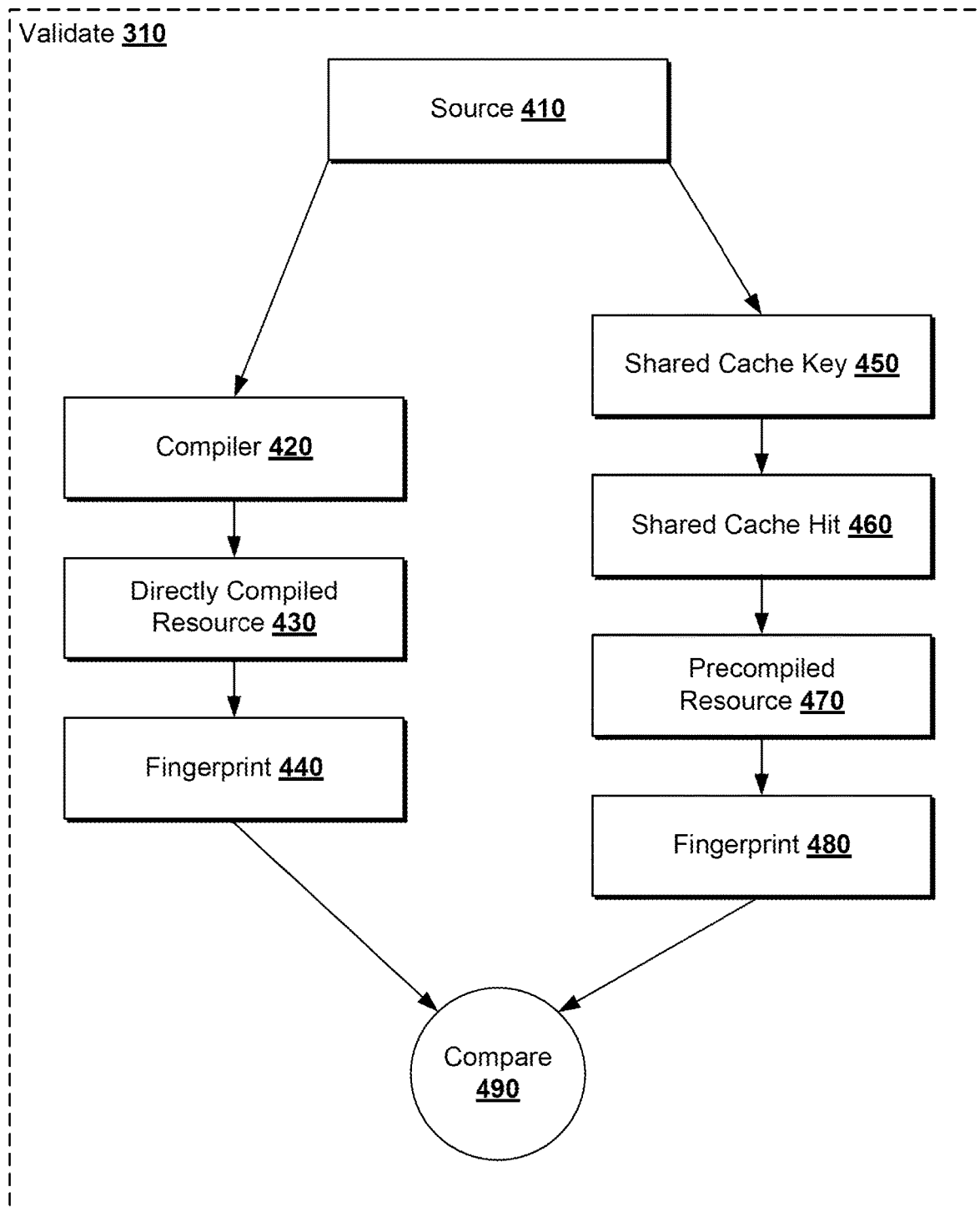
FIG. 4 depicts a block diagram of an example state-based scheme for an example shared compilation cache verification system according to example embodiments of the present disclosure.

An example approach to conducting a validation check 312 is illustrated in the block diagram in FIG. 4. A source 410 (e.g., selected or otherwise determined based on a request to perform operations, etc.) can be provided to each of two processing streams. In one aspect, the source 410 can be provided to a local compiler 420 (e.g., to local compiler 122, such as from a memory 114 to local compiler 122, etc.). The compiler 420 can output a directly compiled resource 430 (e.g., the compiled source 410) which can be processed to obtain a fingerprint 440 that identifies the contents of compiled resource 430. In another aspect, a shared cache key 450 can be associated with the source 410 (e.g., generated based on a request for the source 410, such as a request to perform operations performed by the source 410, etc.), and the shared cache key 450 can be used to query a shared cache (e.g., shared cache 210) to obtain a shared cache hit 460. The shared cache hit 460 can indicate the retrieval of a precompiled resource 470 from the shared cache based on the shared cache key 450 (e.g., the shared cache key 450 being a handle for retrieving the precompiled resource 470). A fingerprint 480 can be obtained based on the precompiled resource 470 that identifies the contents of the precompiled resource 470.

In some embodiments, the fingerprints 440, 480 can be processed at compare 490 to determine whether the precompiled resource 470 is equivalent (e.g., interchangeable, compatible, identical, etc.) to the compiled resource 430. For instance, in some embodiments, the fingerprints 440, 480 can be configured to represent or otherwise identify (e.g., uniquely identify) the contents of the respective resources (e.g., compiled resource 430, precompiled resource 470, etc.) with sufficient granularity to capture differences between the resources that can cause incompatibilities. For instance, in some embodiments, the fingerprints 440, 480 can include hash values or other encodings of the contents (e.g., a portion of, some or all of, etc.) of the respective resources.

In some embodiments, the output of compare 490 can include an indication of the validity of the precompiled resource 470. For instance, a determination of "valid" can be based on a functional equivalence or interoperability with the compiled resource 430. In some embodiments, a match between the fingerprints 440 and 480 (e.g., an identical match, etc.) can indicate validity of the precompiled resource 470.

With reference again to FIG. 3, in some embodiments, if a cache entry is valid, the state of the shared cache is maintained (e.g., at uncertified). In certification cycle 320, the shared cache is evaluated at qualification check 322 to determine whether the shared cache has been sufficiently validated. For instance, in some embodiments, one validated entry can qualify the shared cache. However, in some embodiments, a qualification threshold may require that a plurality of shared cache entries be validated before the shared cache state is set to certified at 324.

In some embodiments, once certified, the shared cache can be periodically re-certified. For instance, in some embodiments, after being certified, the shared cache can periodically (e.g., for selected queries over the cache) recheck validation at 312 for one or more cache entries, with a failure to validate causing the shared cache status to be set as invalid. In some embodiments, the shared cache status can periodically be reset to uncertified. For instance, the shared cache status can be reset to uncertified to trigger requalification of the cache at 322 via validation of one or more (e.g., a plurality) of shared cache entries at 312. In this manner, for instance, in some embodiments, a certificate (e.g., certificate 214) can be maintained for the shared cache.

In some embodiments, a certificate for the shared cache can be updated based on one or more trigger events. For instance, a shared cache certificate can be updated (e.g., reset, rechecked, etc.) after a set time period, a set number of cache hits, crossing a hit rate threshold, etc. In some embodiments, a shared cache certificate can be updated when a node newly serviced by the shared cache queries the cache—for instance, one or more entries of the shared cache can be validated with respect to the newly serviced node (e.g., validated according to the present disclosure, such as by the techniques discussed with respect to FIG. 4, etc.), such that the shared cache can qualify as certified with respect to the newly serviced node and be trusted to serve shared cache entries to the node. In some embodiments, for instance, a shared cache can contain a plurality of entries: a subset can be used to certify (or re-certify) the shared cache, and part or all of the remainder can be served to a receiving node (e.g., to populate a local cache of the node, etc.).

In some embodiments, if at validation check 312 a cache entry fails to validate, the status of the shared cache can be set to invalid (e.g., at 314). An invalid status or certificate can cause, for example, one or more portions of the shared cache to be deactivated. For example, in some embodiments, an invalidated shared cache stops serving entries to one or more nodes (e.g., all nodes). In some embodiments, the shared cache can revert to a last-known certified state: for instance, the shared cache can drop newly-added entries and/or stop serving newly-serviced nodes that failed to validate entries of the cache (e.g., providing a safe operating mode can be provided until further debugging). In some embodiments, an invalid status update can trigger an update to the shared cache key configuration. For instance, if a shared cache key retrieves an incompatible resource from a shared cache (e.g., leading to a failure to validate), then in some embodiments it may be determined that the shared cache key has failed to identify cached resources with sufficient specificity to capture and respond to cross-node incompatibilities, and a shared cache key configuration schema can be updated to, for example, include more detailed identifiers (e.g., increase a bit depth of the key encoding, alter a generation of the key encoding to capture additional or different information, or otherwise modified to decrease collisions, etc.).

Figure 5:
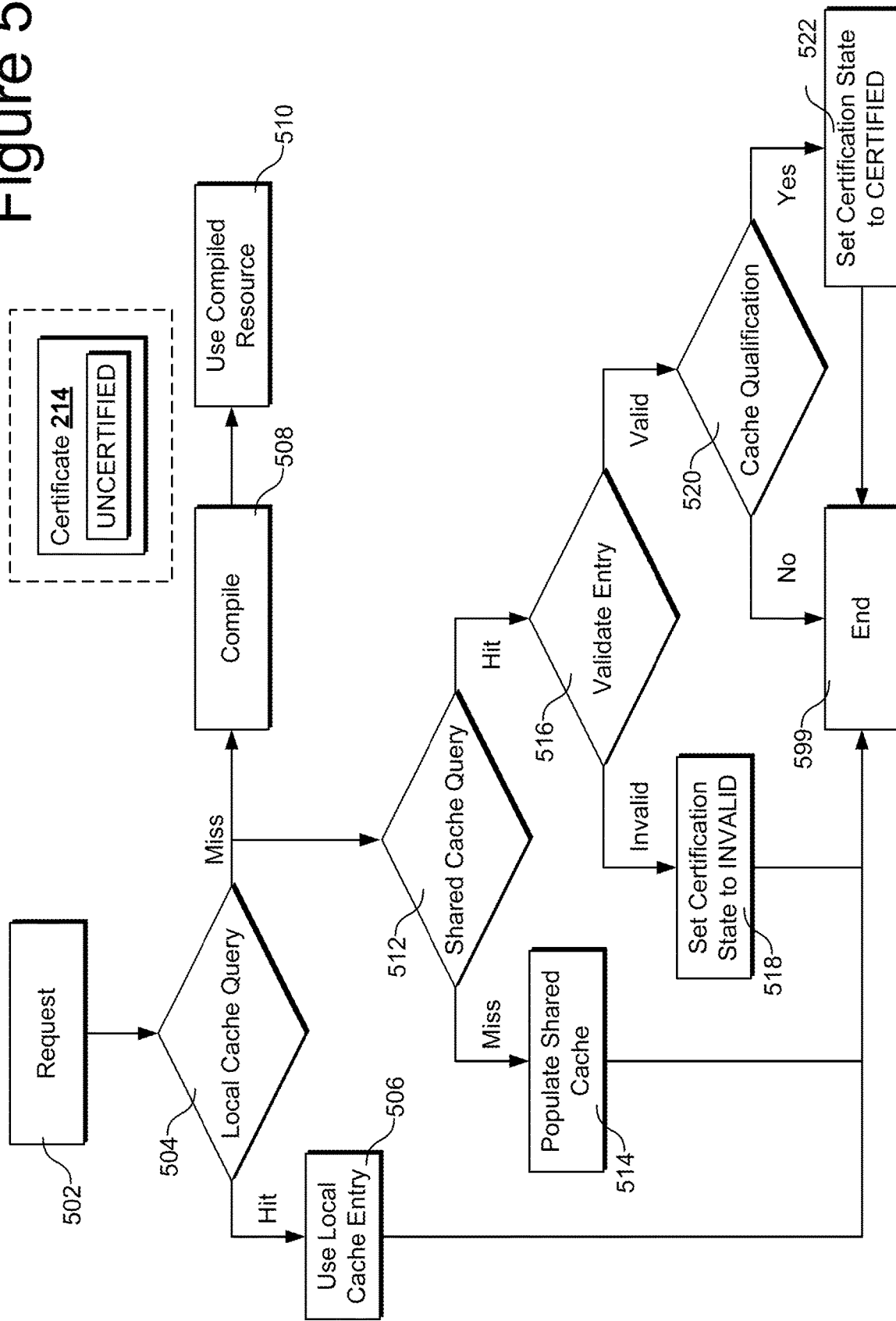
FIG. 5 depicts a block diagram of an example data flow with an uncertified cache for an example shared compilation cache verification system according to example embodiments of the present disclosure.

FIG. 5 illustrates an example expansion of the state-based approach of FIG. 3 when the shared cache is in the uncertified state. Although decision blocks in FIG. 5 are depicted in the arrangement drawn, it is to be understood that additional and alternative arrangements are contemplated and are within the scope of the present disclosure. In some embodiments, at 502, a request can be made for operations to be performed. In some embodiments, for instance, a request can be made of a computing node for the computing node to perform operations (e.g., by invoking a function of the computing node, such as a machine-learned function or operation, etc.). Based on the request 502, it may be determined that a resource is needed for performing the requested operations. In some embodiments, the resource is a computer code resource. In some embodiments, the resource requires or otherwise benefits from compilation for execution. At 504, a local cache can be queried to determine if the needed resource has previously been compiled and is available locally for execution. A hit in the local cache (e.g., indicating a matching entry corresponding to the query) can provide at 506 for using the local cache entry to service the request 502, and the data flow can end at 599 for the present cycle or iteration. A miss in the local cache (e.g., indicating a failure to find an entry corresponding to the query) can provide at 508 for compiling the needed resource (e.g., locally, on a server, etc.) for the computing node and—because the shared cache is in the uncertified state—using at 510 the compiled resource. At 512, the shared cache can be queried (e.g., using a shared cache key) for an entry corresponding to the needed resource. If the query misses, the shared cache can be populated at 514 with the resource compiled at 508. If the query hits and an entry is retrieved from the cache, the retrieved resource can be validated at 516 (e.g., validated by comparison of the compiled resource and the retrieved resource from the cache). If invalid, the certification state or certificate for the shared cache can be updated at 518 from UNCERTIFIED to INVALID. If the retrieved resource is valid (e.g., matching, compatible, interoperable, etc. with the compiled resource), at 520 it can be determined whether the cache has been sufficiently validated to qualify for certification. If not, the cycle or iteration ends, optionally while incrementing a validation count or other indicator of the validation at 516. If the cache does qualify (e.g., based on a qualification metric, such as a threshold number of valid entries retrieved, etc.), the certification state can be updated at 522 from UNCERTIFIED to CERTIFIED.

Figure 6:
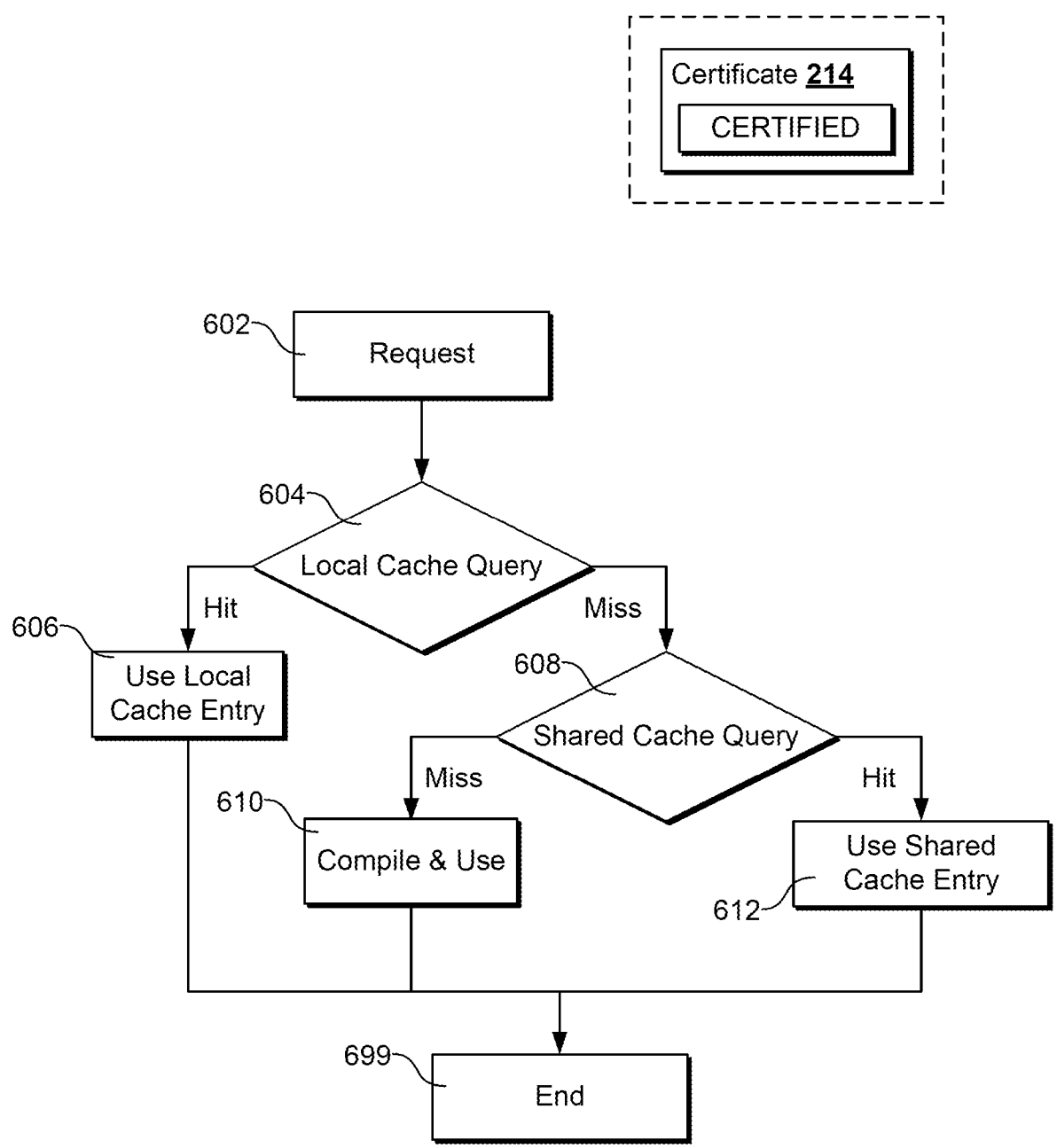
FIG. 6 depicts a block diagram of an example data flow with a certified cache for an example shared compilation cache verification system according to example embodiments of the present disclosure.

FIG. 6 illustrates an example expansion of the state-based approach of FIG. 3 when the shared cache is in the certified state. Although decision blocks in FIG. 6 are depicted in the arrangement drawn, it is to be understood that additional and alternative arrangements are contemplated and are within the scope of the present disclosure. In some embodiments, at 602, a request for operations can be obtained. Based on request 602, a local cache can be queried at 604 for entries corresponding to resources needed to perform the requested operations. If the query returns a hit, the retrieved local cache entry can be used at 606 to perform the requested operations, and the present cycle can end at 699. If the local cache query misses, the certified shared cache can be queried at 608. If the shared cache also misses, the needed resource can be compiled (e.g., locally, at a server, etc.) and used at 610. However, if the shared cache query returns a hit (e.g., retrieving a shared cache entry using a shared cache key as a handle), the retrieved shared cache entry can be used at 612.

Figure 7:
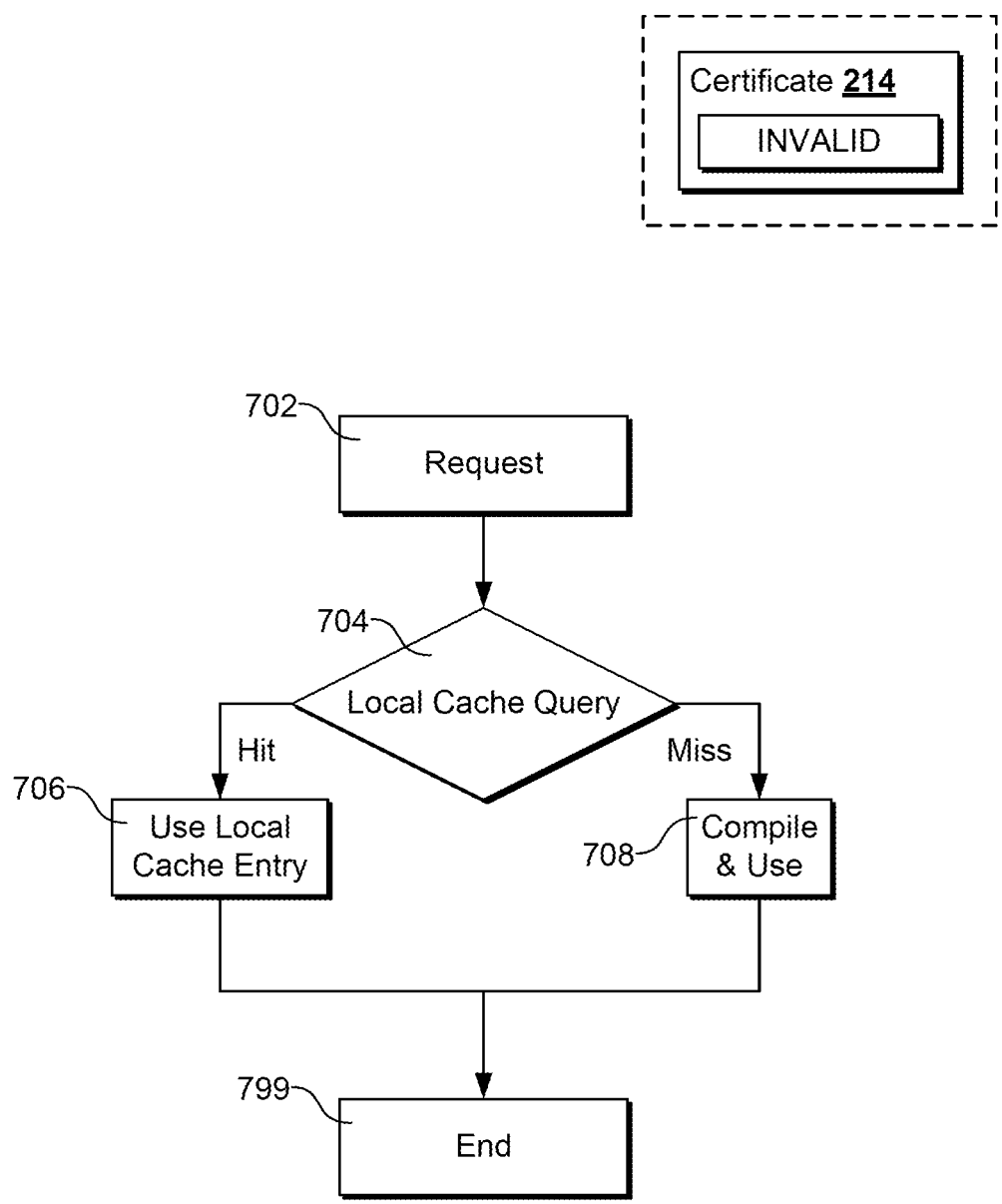
FIG. 7 depicts a block diagram of an example data flow with an invalid cache for an example shared compilation cache verification system according to example embodiments of the present disclosure.

FIG. 7 illustrates an example expansion of the state-based approach of FIG. 3 when the shared cache is in the invalid state. Although decision blocks in FIG. 7 are depicted in the arrangement drawn, it is to be understood that additional and alternative arrangements are contemplated and are within the scope of the present disclosure. In some embodiments, at 702, a request for operations can be obtained. Based on request 702, a local cache can be queried at 704 for entries corresponding to resources needed to perform the requested operations. If the query returns a hit, the retrieved local cache entry can be used at 706 to perform the requested operations, and the present cycle can end at 799. If the local cache query misses, the needed resource can be compiled (e.g., locally, at a server, etc.) and used at 708.

Example Methods

Figure 8:
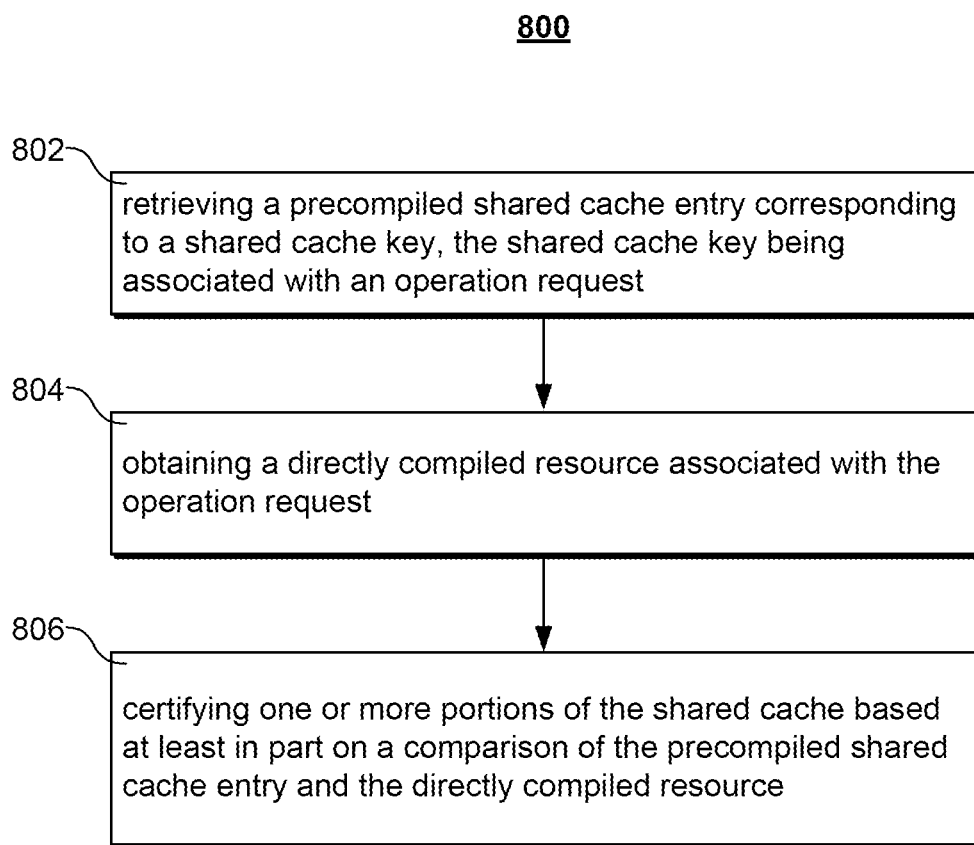
FIG. 8 depicts a flow chart diagram of an example method to perform shared cache validation according to example embodiments of the present disclosure.

FIG. 8 depicts a flow chart diagram of an example method 800 to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

In some example aspects, example method 800 provides, in some embodiments, a computer-implemented method for certifying a shared cache. For example, a computing node or device (e.g., of a computing system) can receive a request to perform an operation. For example, the request can include substantially any processing task, such as a function call, queued task, distributed process, etc. Performing operations can use, execute, or otherwise implement one or more resources. In some embodiments, the resources can be compiled for performing the operation (e.g., need to be compiled to function, perform better when compiled, etc.)— in some embodiments, for instance, performing a requested operation can include executing compiled computer code.

In some embodiments, a compiled resource is desired for performing an operation. A cache of previously used or obtained resources can, in some embodiments, to improve a speed of performing operations using the cached resources (e.g., by providing for retrieval faster than re-compiling the resource). In some embodiments, however, the example method 800 includes determining, by the computing system, an absence of a locally-cached precompiled resource associated with the operation request. For instance, a computing node or device can query a first cache (e.g., a local cache) to obtain a cached copy of a precompiled resource. However, in some cases, the first cache (e.g., local cache) does not contain the requested resource.

At 802, example method 800 can include retrieving a precompiled shared cache entry corresponding to a shared cache key. The shared cache key can, in some embodiments, be associated with an operation request. For instance, the operation request can indicate an operation to be performed and be associated with a shared cache key for retrieving one or more resources for performing the operation. For example, in some embodiments, a shared cache key can be generated based at least in part on the operation request and configured to identify one or more resource(s).

At 804, example method 800 can include obtaining a directly compiled resource associated with the operation request (e.g., from a just-in-time compiler). For example, in some embodiments, the computing system can both retrieve a precompiled shared cache entry and generate or otherwise obtain a directly compile resource corresponding to the precompiled shared cache entry.

At 806, example method 800 can include certifying one or more portions of the shared cache based at least in part on a comparison of the precompiled shared cache entry and the directly compiled resource (e.g., as described above with respect to FIGS. 3 to 7). In some embodiments, for example, the comparison includes a comparison of a fingerprint (e.g., hash, etc.) for the directly compiled resource with a fingerprint for the precompiled shared cache entry. In some embodiments, the precompiled shared cache entry was compiled for or by the same or an equivalent computing system as was the directly compiled resource, such that the precompiled shared cache entry and the directly compiled resource are effectively equivalent (e.g., interoperable, interchangeable, etc.) and/or identical.

A comparison failing to indicate a match can indicate, for example, that the precompiled shared cache entry is not a valid equivalent for the directly compiled resource and thus was invalidly retrieved by the shared cache key. For example, the example method 800 can include deactivating, by the computing system, the one or more portions of the shared cache based at least in part on determining that the precompiled shared cache entry is invalid. Deactivating one or more portions of the shared cache A comparison indicating a match can indicate, for example, that the precompiled shared cache entry is valid and was validly retrieved by the shared cache key. In this manner, for instance, it may be determined that a shared cache is reliably serving compatible cached resources and can be used to supply precompiled resources for performing requested operations. In some embodiments, a qualification threshold can be used to determine a number of validated entries before certifying one or more portions of the shared cache as a whole. For instance, the example method 800 can include updating, by the computing system, a plurality of comparisons indicating validity of one or more shared cache entries of the shared cache, the plurality of comparisons corresponding to a qualification threshold, and determining, by the computing system, to certify the shared cache based at least in part on the plurality of comparisons meeting the qualification threshold.

In some embodiments, the example method 800 can include maintaining, by the computing system, a certification state for the one or more portions of the shared cache. For example, in some embodiments (e.g., as described above with respect to FIGS. 3 to 7), a certificate for a shared cache (e.g., or one or more portions thereof) can be indicative of a certification state of uncertified, certified, invalid, etc. The example method 800 can include, for example, updating, by the computing system, the certification state based at least in part on the comparison. In some embodiments, example method 800 includes resetting, periodically and by the computing system, the certification state for the shared cache. For instance, it may be desired to periodically recertify one or more portions of the shared cache (e.g., for reliability, security, maintenance, etc.).

Figure 9:
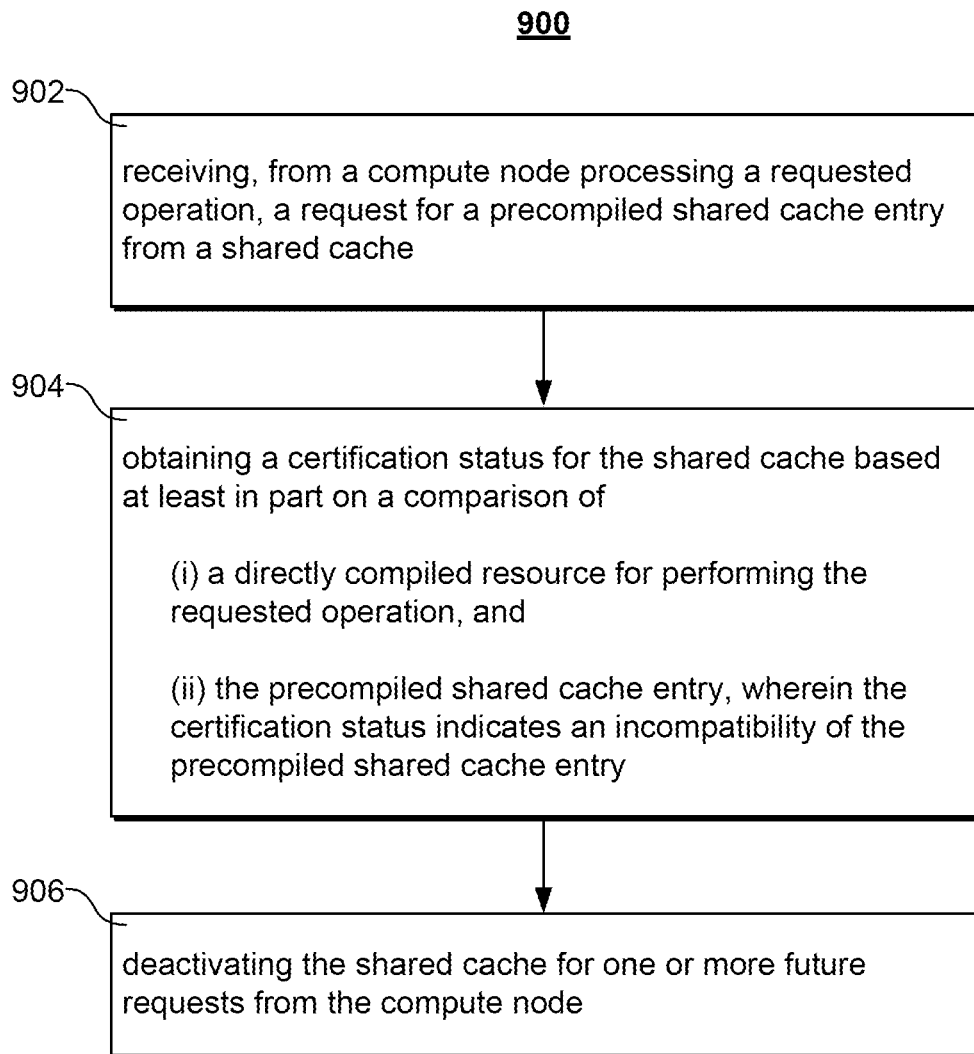
FIG. 9 depicts a flow chart diagram of another example method to perform shared cache validation according to example embodiments of the present disclosure.

FIG. 9 depicts a flow chart diagram of an example method 900 to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, example method 900 can include receiving, from a compute node processing a requested operation, a request for a precompiled shared cache entry from a shared cache. In some embodiments, the shared cache entry is retrieved for the compute node using a shared cache key.

At 904, example method 900 can include obtaining a certification status for the shared cache (e.g., as described above with respect to FIGS. 3 to 7) based at least in part on a comparison of (i) a directly compiled resource for performing the requested operation (e.g., compiled by the compute node, for the compute node, such as by a just-in-time compiler, etc.), and (ii) the precompiled shared cache entry, wherein the certification status indicates an incompatibility of the precompiled shared cache entry. In some embodiments, the comparison can include a comparison of a fingerprint for the directly compiled resource with a fingerprint for the precompiled shared cache entry.

At 906, example method 900 can include deactivating the shared cache for one or more future requests from the compute node. For example, a shared cache can be taken entirely offline. For instance, if a shared cache key retrieves a shared cache entry that is not compatible with the querying node, then the shared cache can be taken offline (e.g., stopping service of cached entries) to prevent further service of incompatible entries under the shared cache key scheme. For instance, a validation failure can indicate, in some embodiments, a failure of a shared cache key schema to precisely identify compatible resources for a requesting computing system/device and distinguish incompatible resources. In some embodiments, a shared cache can be reset to a last-known safe configuration (e.g., a state as of previous validation, etc.) and/or one or more previously validated and certified portions of the shared cache can be maintained while one or more other portions can stop service.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for certifying a shared cache, comprising:
   retrieving, by a computing system comprising one or more processors, a precompiled shared cache entry corresponding to a shared cache key, the shared cache key being associated with an operation request;
   obtaining, by the computing system, a directly compiled resource associated with the operation request; and
   certifying, by the computing system, one or more portions of the shared cache based at least in part on a comparison of the precompiled shared cache entry and the directly compiled resource.

2. The computer-implemented method of claim 1, further comprising:
   determining, by the computing system, an absence of a locally-cached precompiled resource associated with the operation request.

3. The computer-implemented method of claim 1, wherein obtaining, by the computing system, a directly compiled resource associated with the operation request comprises:
   obtaining, by the computing system and from a just-in-time compiler, the directly compiled resource.

4. The computer-implemented method of claim 1, wherein the comparison comprises a comparison of a fingerprint for the directly compiled resource with a fingerprint for the precompiled shared cache entry.

5. The computer-implemented method of claim 1, wherein certifying, by the computing system, one or more portions of the shared cache based at least in part on the comparison comprises:
   updating, by the computing system, a plurality of comparisons indicating validity of one or more shared cache entries of the shared cache, the plurality of comparisons corresponding to a qualification threshold.

6. The computer-implemented method of claim 5, further comprising:
   determining, by the computing system, to certify the shared cache based at least in part on the plurality of comparisons meeting the qualification threshold.

7. The computer-implemented method of claim 1, wherein certifying, by the computing system, one or more portions of the shared cache based at least in part on the comparison comprises:
   deactivating, by the computing system, the one or more portions of the shared cache based at least in part on determining that the precompiled shared cache entry is invalid.

8. The computer-implemented method of claim 1, further comprising:
   maintaining, by the computing system, a certification state for the one or more portions of the shared cache; and
   updating, by the computing system, the certification state based at least in part on the comparison.

9. The computer-implemented method of claim 8, further comprising:
   resetting, periodically and by the computing system, the certification state for the shared cache.

10. A non-transitory, computer-readable medium storing instructions that, when executed, cause one or more processors to perform operations, the operations comprising:
    retrieving a precompiled shared cache entry corresponding to a shared cache key, the shared cache key being associated with an operation request;
    obtaining a directly compiled resource associated with the operation request; and
    certifying one or more portions of the shared cache based at least in part on a comparison of the precompiled shared cache entry and the directly compiled resource.

11. The computer-readable medium of claim 10, wherein the operations further comprise:
    determining an absence of a locally-cached precompiled resource associated with the operation request.

12. The computer-readable medium of claim 10, wherein obtaining a directly compiled resource associated with the operation request comprises:
    obtaining, from a just-in-time compiler, the directly compiled resource.

13. The computer-readable medium of claim 10, wherein the comparison comprises a comparison of a fingerprint for the directly compiled resource with a fingerprint for the precompiled shared cache entry.

14. The computer-readable medium of claim 10, wherein certifying the shared cache based at least in part on the comparison comprises:
    updating a plurality of comparisons indicating validity of one or more shared cache entries of the shared cache, the plurality of comparisons corresponding to a qualification threshold.

15. The computer-readable medium of claim 14, wherein the operations further comprise:
    determining to certify the shared cache based at least in part on the plurality of comparisons meeting the qualification threshold.

16. The computer-readable medium of claim 10, wherein certifying the shared cache based at least in part on the comparison comprises:
    deactivating the one or more portions of the shared cache based at least in part on determining that the precompiled shared cache entry is invalid.

17. The computer-readable medium of claim 10, wherein the operations further comprise:
    maintaining a certification state for the one or more portions of the shared cache; and
    updating the certification state based at least in part on the comparison.

18. A shared cache verification system, comprising:
one or more processors; and
one or more non-transitory, computer-readable media that comprise instructions that, when executed, cause the one or more processors to perform operations, the operations comprising:
- receiving, from a compute node processing a requested operation, a request for a precompiled shared cache entry from a shared cache;
- obtaining a certification status for the shared cache based at least in part on a comparison of (i) a directly compiled resource for performing the requested operation on the compute node and (ii) the precompiled shared cache entry, wherein the certification status indicates an incompatibility of the precompiled shared cache entry with the compute node; and
- deactivating the shared cache for one or more future requests from the compute node based at least in part on the certification status.

19. The system of claim 18, wherein the directly compiled resource was compiled for the compute node.

20. The system of claim 19, wherein the comparison comprises a comparison of a fingerprint for the directly compiled resource with a fingerprint for the precompiled shared cache entry.

* * * * *